US011874799B1

(12) United States Patent
Monson

(10) Patent No.: US 11,874,799 B1
(45) **Date of Patent: *Jan. 16, 2024**

(54) SYSTEMS AND METHODS FOR MEMORY MANAGEMENT IN SOURCE AGNOSTIC CONTENT STAGING

(71) Applicant: Fannie Mae, Washington, DC (US)

(72) Inventor: Richard Monson, Washington, DC (US)

(73) Assignee: Fannie Mae, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,709

(22) Filed: Feb. 21, 2022

Related U.S. Application Data

(63) Continuation of application No. 15/970,684, filed on May 3, 2018, now Pat. No. 11,256,664.

(60) Provisional application No. 62/502,245, filed on May 5, 2017.

(51) Int. Cl.
*G06F 16/17* (2019.01)
*G06F 16/21* (2019.01)
*G06F 16/11* (2019.01)
*G06F 16/16* (2019.01)

(52) U.S. Cl.
CPC ........ *G06F 16/1727* (2019.01); *G06F 16/122* (2019.01); *G06F 16/162* (2019.01); *G06F 16/211* (2019.01)

(58) Field of Classification Search
CPC .. G06F 16/1727; G06F 16/122; G06F 16/162; G06F 16/211
See application file for complete search history.

(56) References Cited

U.S. PATENT DOCUMENTS

| | | | |
|---|---|---|---|
| 6,618,719 B1 | 9/2003 | Andrei | |
| 2006/0253849 A1 | 11/2006 | Avram et al. | |
| 2009/0077097 A1* | 3/2009 | Lacapra | G06F 16/1827 |
| 2011/0055261 A1 | 3/2011 | Makkar et al. | |
| 2011/0314095 A1* | 12/2011 | Gupta | H04N 21/44012 709/203 |
| 2012/0102067 A1* | 4/2012 | Cahill | G06F 16/27 707/E17.014 |
| 2016/0173603 A1 | 6/2016 | Ainscow et al. | |
| 2016/0283219 A1 | 9/2016 | Banford et al. | |
| 2017/0357680 A1 | 12/2017 | Mackovitch | |

* cited by examiner

*Primary Examiner* — Apu M Mofiz
*Assistant Examiner* — Cindy Nguyen
(74) *Attorney, Agent, or Firm* — Foley & Lardner LLP

(57) ABSTRACT

A content staging system includes a content engine structured to receive content including a plurality of dataset elements from a content source, determine whether a content amount of the received content exceeds a memory capacity threshold, and auto-switch between memory and a file system during content processing based on the content amount. The content staging system includes a processing engine communicably coupled to the content engine. The processing engine is structured to receive the content including a plurality of dataset elements, and transform the plurality of dataset elements based on a source agnostic file definition format. The source agnostic file definition format supports content encryption, track a field of the plurality of dataset elements, or a combination thereof.

24 Claims, 5 Drawing Sheets

400

```
<SCRIPT>
<RunCommand CommandLine- "D:\_mappings.bat" workDirectory="D:\"/>
<ExecuteSql Command@SelfServiceScan.Jobinformation~" ConnectionID= "CAST">
     <SQLParmeter SqlType= "Int" value=@local.JobKey~"/>
<ExecuteSql>
<Tokens>
<ScanPath AnalyzedFolder=@Constants.FMMA_Projects \Analyzed" DeliveredFolder=@Constants.FMMAProjects~ \Delivered"/
<ScanPath PreviousScan="@Constants.FMMA_Projects~PreviousScan" PreviousAnalyzedFolder="@ScanPAth.PreviousScan \Analyzed
<Tokens>
<Delete Path="@ScanPAth.PreviousAnalyzedFolder~" Required=False"/>
<Delete Path="@ScanPAth.PreviousDeliveredFolder~" Required=False"/>
<Delete Path="@ScanPAth.Previous~\Version.txt" Required=False"/>
<Move Destination="@ScanPath.PreviousDeliveredFolder~" Required="False" Source="ScanPath.DeliveredFolder~ ">
<Exclude Regex="(71.svn"/>
</Move>
<Delete Path="@ScanPath.DeliveredFolder~" Required="False/>
 <Move Destination="@ScanPath.PreviousScan~\Version.text" Required=False" Source="@ScanPath.AnalyzedFolder~ \Version.text
<Move Destination="@ScanPath.PreviousAnalyzedFolder~" Required=False" Source="@ScanPath.AnalyzedFolder~"\>
 <Note Message="Pulls the source code from SVN into the application Delivered folder." Required="False"/>
 <Svn LocalPath="@ScanPath.DeliveredFolder~">
   <Clone URL=@LocalData.code_url~"/>
  </Svn>
 <Note Message="The following lines are used to customize the Analyze folder for a particular application"/>
 <Copy Destination="@ScanPath.AnalyzedFolder~\SourceCode "Source=@"ScanPAth.DeliveredFolder~ " >
 <ExcludeDBResultSet=Column" exclude_path" Command="@SelfServiceScan.GetExclusions~" ConnectionID="CAST">
        <SqlParameter SqlType="int" Value="@Local.JobKey~"/>
      </ExcludeDBResultSet>
     </Exclude Comment="Skip the project local repository directories" Regex="(?i)CVS"/>
     </Exclude Comment="Skip the svn local repository directories" Regex="(?i)\.svn"/>
     </Exclude Comment="Skip the git local repository directories" Regex="(?i)\.git"/>
     </Exclude Comment="Skip all of the unit test directories" Regex="(?i)^text"/>
     </Exclude Comment="Skip all of the bin directories" Regex="(?i)^bin"/>
     </Exclude Comment="Skip all of the target directories" Regex="(?i)^target"/>
     </Exclude Comment="Skip all of the buildscript directories" Regex="(?i)^buildscript"/>
  </Copy>
```

| MODULE | DESCRIPTION | VALUE | ELAPSED TIME |
|---|---|---|---|
| APPS  DEVELOPER PLATFORMS △ A BASIC UPSERTS — CMS USING THE △ PROCESS WRITING | | | |
| ENVIRONMENT INFORMATION | STARTED | March 1, 2018 06:54:06 | 0.422s |
| | USER ACCOUNT NAME | sctadmin4 | 0.468s |
| | MACHINE NAME | dwv-e3h-w011 | 1.187s |
| | JAVA VERSION | 180_65 | 1.187s |
| | JAVA ARCHITECTURE | 6-1 bit | 1.187s |
| | JAVA HOME | \dwsys-apcas101\s5\CAST\Implementation:Tools\Grityak1_b0_65yre | 1.187s |
| | JAVE VENDOR | Oracle Corporation | 1.187s |
| | JAVA CLASS PATH | View Test | 1.187s |
| | JVM MAXIMUM MEMORY | 7,282 Megabytes | 1.187s |
| | JVM TOTAL ALLOCATED MEMORY | 491 Megabytes reserved | 1.187s |
| | JVM USED MEMORY | 23 Megabytes | 1.187s |
| | JVM FREE MEMORY | 467 Megabytes | 1.187s |
| | OPERATING SYSTEM NAME | Windows Server 2012 R2 | 1.187s |
| | USER WORKING DIRECTORY | D-PIE | 1.203s |
| DEFINITION DETAILS | FILE NAME | PEWholeloanFE.xml | 1.218s |
| | FULL PATH | \cdv\sys-apcast101\CAST\Implementation\Tools\gin\Definitions\PEWholeloanFE.xml | 1.218s |
| | LAST MODIFIED DATE | Thu Sep 15 11:13:36 EDT 2018 | 1.218s |
| | SIZE | 2189bytes | 1.218s |
| SET UP TOKEN DICTIONARIES | LOAD TOKENS | REad value from settings file. | 1.265s |
| | | @Configuration.ApplicationPath~=\dwsys-apcas101\s5\CAST\Implementation\Tools\git | |
| | | @Configuration.LogPath~=\dwsys-apcas101\cast-logs | 1.281s |
| | | @Configuration.RandomLogFile~=False | |
| | | @Configuration.UpdateScanManager~=True | |
| | TOKEN ADDED | View Text | 1.297s |
| | TOKENDS ADDED | View Text | 1.328s |
| | PREPARED DEFINITION | View Definition | 3.375s |

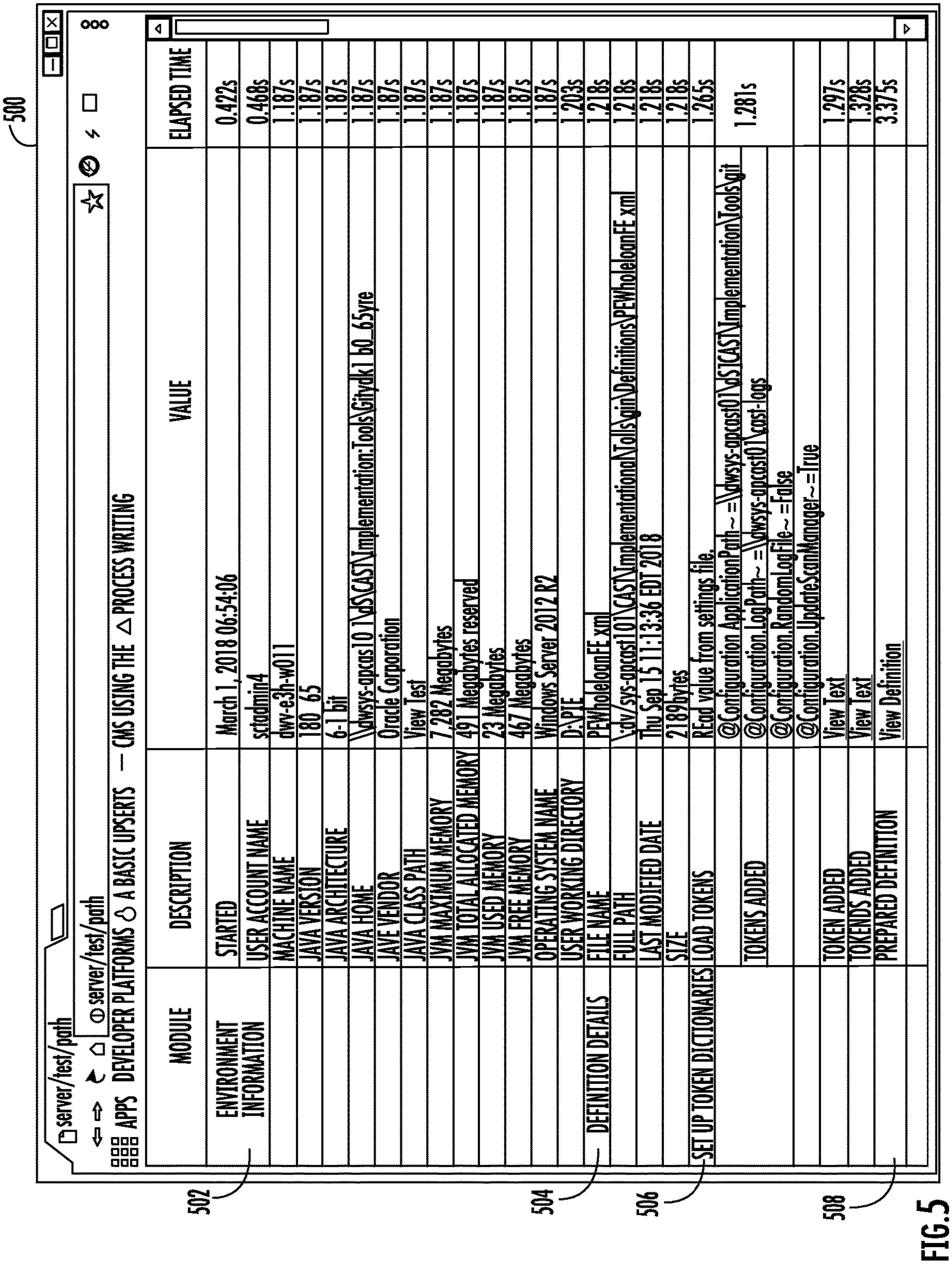

FIG.5

SYSTEMS AND METHODS FOR MEMORY MANAGEMENT IN SOURCE AGNOSTIC CONTENT STAGING

PRIORITY CLAIM

This application is a continuation of and claims priority to U.S. patent application Ser. No. 15/970,684, filed May 3, 2018, now U.S. Pat. No. 11,256,664, entitled "Systems and Methods for Memory Management in Source Agnostic Content Staging," which claims priority to U.S. App. No. 62/502,245, filed on May 5, 2017. These applications are incorporated herein by reference for all purposes.

TECHNICAL FIELD

The present application relates to source agnostic systems and methods. In particular, the present application relates to systems and methods for memory management in source agnostic content staging.

BACKGROUND

In conventional data processing and business intelligence (BI) applications, a disk-based approach is typically used. Data is loaded on to the computer's hard disk in the form of tables and multi-dimensional structures against which queries are run. Disk-based processing systems are designed for the requirements of transactional rather than analytical processing. The format of the data tables varies according to the database management tool that is used. Thus, it is difficult and/or resource-intensive to join data from multiple sources. In a database management system that supports insert and update operations as well as aggregations, joins (typical in analytical business intelligence applications) are typically very slow. Another drawback is that the disk-based approach is designed to fetch rows of data, while BI queries usually involve fetching of partial rows of data involving heavy calculations.

SUMMARY

In one embodiment, a content staging system comprises a content engine structured to receive content comprising a plurality of dataset elements from a content source, determine whether a content amount of the received content exceeds a memory capacity threshold, and auto-switch between memory and a file system during content processing based on the content amount. The content staging system further comprises a processing engine communicably coupled to the content engine, the processing engine structured to receive the content comprising a plurality of dataset elements, and transform the plurality of dataset elements based on a source agnostic file definition format, wherein the source agnostic file definition format supports content encryption, tracks a field of the plurality of dataset elements, or performs a combination thereof.

One embodiment relates to a content staging system comprising a content source and a server communicably coupled to the content source. The server is structured to receive, via a processing engine, content comprising a plurality of dataset elements from the content source, transform, via the processing engine, the content based on a source agnostic file definition format, wherein the source agnostic file definition format supports content encryption, track a field of the plurality of dataset elements, or a combination thereof, and execute, via an content staging engine, a system action associated with the transformed data, wherein the system action is executed according to one or more action elements.

One embodiment relates to a method of facilitating a content staging system associated with a software framework. The method comprises: receiving, via a processing engine, content comprising a plurality of dataset elements from a content source, determining, via an execution engine, whether a content amount of the received content exceeds a memory capacity threshold of the memory, causing, via a content engine, an auto-switch between the memory and a file system during content processing based on the content amount, transforming the content based on a source agnostic file definition format according to an execution plan, and executing, via an content staging engine, a system action associated with the transformed data, wherein the system action is executed according to one or more action elements.

One embodiment relates to a content staging system associated with a software framework. The content staging system comprises a client device and a content engine structured to receive content comprising a plurality of dataset elements from a content source, determine whether a content amount of the received content exceeds a memory capacity threshold, and auto-switch between memory and a file system during content processing based on the content amount. The content staging system further comprises a processing engine communicably coupled to the client device and the content engine, the processing engine structured to receive the content comprising a plurality of dataset elements and transform the plurality of dataset elements based on a source agnostic file definition format, wherein the source agnostic file definition format supports content encryption, tracks a field of the plurality of dataset elements, or performs a combination thereof.

These and other features, together with the organization and manner of operation thereof, will become apparent from the following detailed description when taken in conjunction with the accompanying drawings.

BRIEF DESCRIPTION OF THE FIGURES

FIG. 4 is an example job definition for the content staging system.

FIG. 5 is an example log file generated by the content staging system.

DETAILED DESCRIPTION

Figure 1:
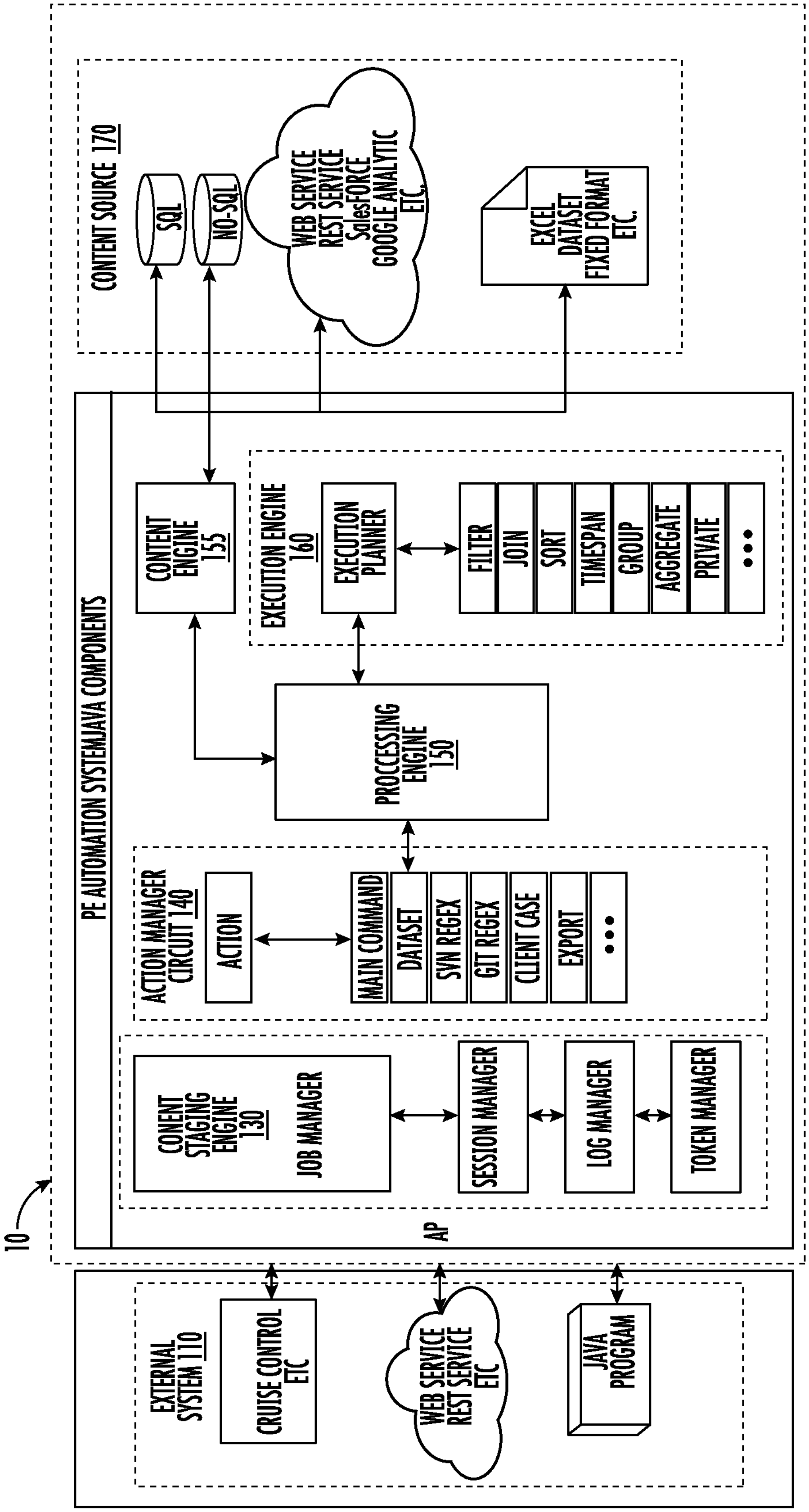
FIG. 1 is a block diagram of a content staging system according to an example embodiment.

Referring to the figures generally, systems and methods for content staging are described. The content staging system may be associated with a software framework such that the content staging system may execute various actions associated with or performed within the framework. The content staging system may receive content comprising a plurality of dataset elements from a content source. In some embodiments, the content staging system may determine whether a content amount of the received content exceeds a memory capacity threshold. The content staging system may auto-switch between memory and a file system during content processing based on the content amount such that the content may be stored in memory and/or the file system as needed. The content staging system may be further structured to transform the plurality of dataset elements based on a source agnostic file definition format. The source agnostic file definition format supports content encryption, tracks a field of the plurality of dataset elements, or a combination thereof as described herein below.

Advantageously, the content staging system streamlines deployment of content (such as data, software code, etc.) to its target system(s), such as production environments. The content staging system is source agnostic, provides improved memory management, and allows end users to build and track complex content transformation and analytical schemas.

In terms of being source agnostic, the content staging system accepts content (e.g., data, computer code, images, etc.) from a variety of sources, such as relational databases, spreadsheets, XML files, software code packages, etc. The content staging system builds a content source agnostic file format to hold the inbound content. Advantageously, the content source agnostic file format is designed to be efficient. For example, the content is structured for fast retrieval and efficient processing. The content source agnostic file format contains a header and a footer that provide detailed information about the file content relative to estimated system performance, such as the file size, first row content, last row content, field content processing and content profile for each row (sums, averages, min, max, null count, etc.) Advantageously, the header and/or footer are configured to store global repeating values for certain fields such that the need for duplicating the value in every row of a large dataset is eliminated. Furthermore, the header and/or footer include the source system(s) and an expiration timestamp so that multiple requests for staged content from the source system (s) can be completed using a single source agnostic file previously created.

In terms of providing improved memory management, in some embodiments, the system is configured to switch between in-memory and file-based processing based on evaluating the size of the source agnostic file. In some embodiments, the size of the source agnostic file is evaluated against a predetermined threshold. In some embodiments, the size of the source agnostic file is periodically evaluated while the source agnostic file is processed (e.g., written, transformed, etc.) and the processing is accordingly switched between in-memory processing if the current size is below the threshold and file-based processing if the current size is above the threshold. Advantageously, the memory requirement evaluation process is simplified because the staged content is stored in source agnostic files that conform to substantially the same formatting requirements.

In terms of supporting complex content processing, in addition to providing memory switching, the header and/or footer of the source agnostic file is configured to contain an index to speed up content retrieval from within the file or by joining the information from the file to that contained in other files. For example, the index may comprise a content structure numbering individual records. In some embodiments, the index comprises a fingerprint that points to indices contained in other source agnostic files, such that in-memory joins are facilitated. Because memory resources required for a join are minimized, multiple operations and/or users can be simultaneously supported. An additional advantage of the systems and methods for source agnostic content staging is that the "staging" model, conventionally used only for data transformation, is structured to support software code analysis. For example, the system may be structured to automatically obtain, consolidate and provide software code files to an external code analysis system. Where an external code analysis system has an API or where the code analysis system is part of the source agnostic content staging system, the source agnostic content staging system may be further configured to execute the functions provided by the external code analysis system and thus take advantage of the memory and processing optimization techniques, described herein, when analyzing the code.

Illustrated in FIG. 1 is a content staging system 10. The content staging system 10 is a backend computer system that uses a source agnostic file definition format (e.g., a binary content file format) for staging content during processing. The content staging system 10 may comprise a file format (e.g., a package file format) that aggregates programmatic class files (e.g., JAVA class files), metadata, and/or other resources (e.g., text, images, etc.) into one or more files. In some examples, the content staging system 10 may comprise an application programming interface (API) for scalability, portability, integration, and communication with various servers (e.g., Gradle, Jenkins, etc.), web services (e.g., a REST service as described herein), other programs or applications, headless browsers (e.g., a web browser without a graphical user interface (GUI) that may be executed from a command line), or a combination thereof. Accordingly, the content staging system 10 includes a content staging engine 130, an action management circuit 140, a processing engine 150, a content engine 155, an execution engine 160, and a content source 170. The content staging system 10 may communicate with a third party system (e.g., the external system 110). As described herein, the content staging system 10 is structured to facilitate (1) the staging of content, (2) high speed access, (3) cache support, (4) elimination of redundant data, (5) optimization of memory storage capacity, (6) and advanced views of content via the various engines, circuits, systems, and components described herein.

As illustrated, the content staging system 10 includes the content engine 155. The content engine 155 may be structured to receive content. The content may be received via the content source 170, the processing engine 150, or other systems, components, circuits, or sources structured to provide content. Accordingly, the content engine 155 may be communicably coupled to the content source 170, the processing engine 150, etc. In some embodiments, the content engine 155 may be structured to provide data. The content engine 155 may provide the content to the content source 170, the processing engine 150, or other systems, components, circuits, or sources structured to receive content. The content engine 155 may be structured to manage the memory of the content staging system 10 as described herein with reference to FIG. 2.

As illustrated, the content staging system 10 includes the processing engine 150. The processing engine 150 may be communicably coupled to the content engine 155, the action manger circuit 140, the execution engine 160, the content staging engine 130, or a combination thereof. The processing engine 150 may execute instructions stored in memory. The processing engine 150 may be structured to programmatically execute instructions to sufficiently perform at least the operations described herein.

The content staging system 10 includes the content staging engine 130. The content staging engine 130 may be structured to execute a system action. As used herein, the term "system action" may be used to refer to an event, workflow, and/or system operation generated according to a job definition based on one or more action elements. In this regard, an action element includes, but is not limited to, a database creation (e.g., creation of a database for code scanning), code scan, system operation, transformation of data, deletion of empty files, a file system operation (e.g., copy, move, delete, rename, etc.), execution of a command or procedure, exporting content of a dataset (e.g., export the contents of a dataset to a delimited file), working with a code repository or software version (SVN) repository, generation and/or provision of a message to an activity log, creation of a new directory on a file system, execution of an external command, program, or batch file, editing and/or manipulating XML files, compression or decompression of files, interaction with websites and/or remote applications, addition of tokens and/or values to the application scope, deletion of programmatic files that contain only commented code (e.g., code review system crashes), retrieval of dependencies (e.g., internal and/or external dependencies) for a build execution tool, etc. The content staging engine 130 may include a job manager, a session manager, a log manager, and/or a token manager to execute the functions described herein.

The content source 170 may be used to refer to a database (e.g., a set of data that may be accessed via a database management system), network source, delimited text file, fixed format file, or any other source of content. In some embodiments, the content source 170 may include logical components and/or physical components that include items written to a disc, such as, but not limited to a physical file, a data file, temporary file, or other physical component or hardware. The physical components may be managed by a root file, circuitry, or other component of the content staging system 10. In some embodiments, content may be received or otherwise retrieved via a network source (e.g., the network 111). The network 111 may communicate over any of a variety of network protocols, including Ethernet, Bluetooth, WiFi, and the like. The content source 170 is structured to maintain content associated with various applications, systems, workflows, and/or system actions. The content source 170 may store application data, system data, action content (e.g., workflow data) or a combination thereof.

Figure 2:
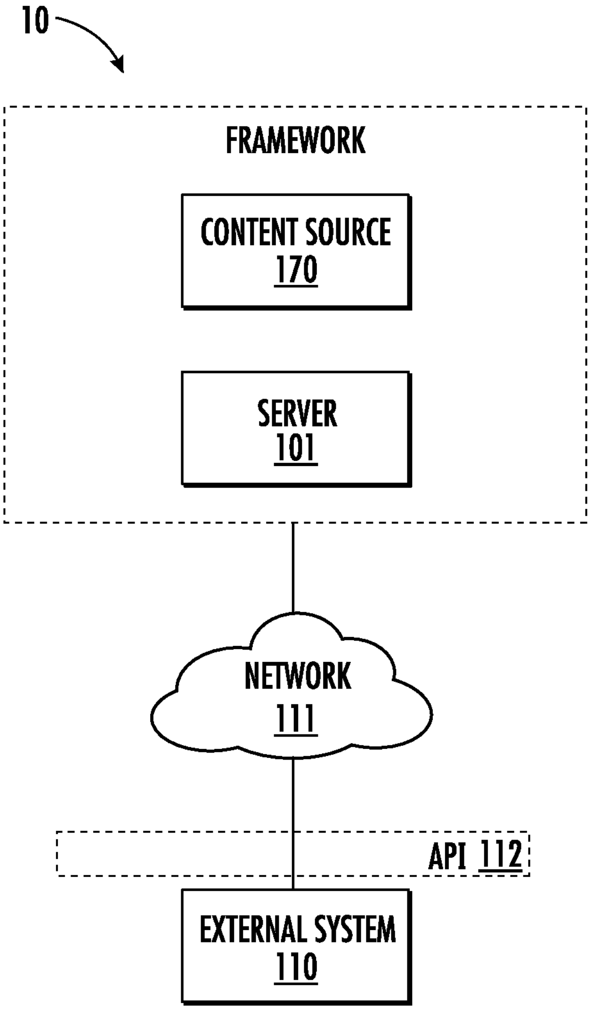
FIG. 2 is a block diagram of a content staging system according to an example embodiment.

As illustrated in FIG. 2, the content staging system 10 may comprise a server 101. The server 101 may comprise or otherwise may be communicably coupled to the content staging engine 130, the action management circuit 140, the processing engine 150, the content engine 155, and/or the execution engine 160 to execute the functions described herein. As depicted, the server 101 is communicably coupled to the database source 170. In some examples, the server 101 may be communicably coupled to the external system 110. The server 101 may comprise a single computer or a plurality of computers.

The server 101 may be structured to receive content from various sources, including but not limited to the content source 170, a client device 102 (described herein with reference to FIG. 3), and/or the external system 110. For example, the server 101 may be operable or otherwise structured to receive, via the content engine 155 and/or the processing engine 150, content (e.g., a plurality of dataset elements) provided by the content source 170 and/or the external system 110. The dataset elements may be received by the processing engine 150. The server 101 may also facilitate, via the processing engine 150, transformation of the content (e.g., of the plurality of dataset elements) provided by the content source 170 and/or the external system 110.

Advantageously, transformation of the content is source agnostic. Once the content (e.g., the dataset elements) is received or otherwise read by the processing engine 150, the source of the content is not relevant. For example, content from a content source 170 (e.g., such as an Oracle® content source, system, database, and/or application) may seamlessly be joined to content from a content source 170 that is derived from a rich site summary (RSS) feed, a relational database management system (RDBMS), a database structured for storage and retrieval of content based on a non-tabular relational database (e.g., a NoSQL database), a representational state transfer (REST) system, etc. The content engine 155, processing engine 150, and/or the execution engine 160 may receive or retrieve content from a content source 170 (e.g., a content source structured to interact with a JDBC driver, ODBC driver, or other drivers and/or providers capable of executing the functions described herein) without the need to alter, change, or update the content staging system 10, its components, circuits, or programmatic instructions.

The transformation of the plurality of dataset elements may be based on a source agnostic file definition format to stage content during processing. In some examples, the source agnostic file definition format may comprise a first format and/or a second format. As used herein, the term "first format" may be used to refer to a content file format structured to include the content received (e.g., imported) or otherwise provided by a dataset element. As used herein, the term "second format" may be used to refer to a content file format comprising a view format (e.g., a partial record format) structured to associate, relate, or otherwise link back to a content record (e.g., the actual content record that is partially viewed). The second format may be structured to generate the view format. In some embodiments, the source agnostic file definition format may take the form of an indexed set of the plurality of dataset elements, a filtered set of the plurality of dataset elements, or a combination thereof. For example, the view format may be an indexed set of the plurality of dataset elements (e.g., an indexed sub-set of a full dataset). Advantageously, the source agnostic file definition format is structured to provide rapid content access, cache support, and generate advanced view datasets.

In some embodiments, the source agnostic file definition format comprises a header, a footer structured to track a field of the plurality of dataset elements, or a combination thereof. Alternatively or additionally, the source agnostic file definition format comprises a footer that supports content encryption, a header structured to track a field of the plurality of dataset elements, or a combination thereof. The header and/or the footer of the source agnostic file definition format may include information used to further enhance system performance. For example, the footer may comprise schema content structured to track the field, maintain a content profile of a content record, and/or track a global repeating value. Advantageously, the source agnostic file definition format supports content encryption, tracks a field of the plurality of dataset elements, or a combination thereof. In this regard, the header may include one or more parameters such as, but not limited to, type of file (e.g., a data or view format), encrypt string values, fingerprints (used to ensure correct dependency references), source content filename, full dataset row count to support content source paging, a first row of content file, a last row of content file, direct access index offset (e.g., a start of table to support high speed row access), schema offset (e.g., a location of encrypted schema data), date parameters, expiration timestamp (e.g., the date and time the cache/in-memory file expires), or a combination thereof.

In some embodiments, the footer comprises an index (e.g., a direct access index) and/or schema data. As described herein, the schema data may be structured to track a field, maintain a content profile of a content record, and/or track a global repeating value. For example, the schema data may store a content profile for each row (e.g. min, max, null count, average, sum, etc.) of content. The processing engine 150 may be further structured to eliminate duplication of the global repeating value on each row of the plurality of datasets. Advantageously, by maintaining (e.g., storing) the global repeating value, the content staging system 10 eliminates duplication of redundant content (e.g., redundant values) on every row of a record set (e.g., a set of content records comprising rows 1 to N), dataset, etc.

In some embodiments, the source agnostic file definition format may be encoded as instructions in one or more circuits of the content staging system 10. In some embodiments, the content staging system 10 may comprise a database, a configuration file, and/or the like that specifies the various aspects of the source agnostic file definition format. The various aspects may include file size, length of the header and/or footer, structure of the header and/or footer, data structure definitions for indices, specifications for positioning of indices within records, etc. The one or more circuits may be structured to query the database, configuration file, etc. to implement these aspects when creating a source agnostic file pursuant to the source agnostic file definition format. In some embodiments, the aspect definitions vary based on a content type (e.g., text, image, software code, etc.), source system, target system, transformation requirements, etc. In some embodiments, the XML job definition file of FIG. 4 supplies all or some of these instructions and/or specifies the source(s) therefor.

The server 101 is further structured to determine, via the processing engine 150 and/or the execution engine 160, data transforms of a system action. For example, the processing engine 150 and/or the execution engine 160 may examine a data transform or a plurality of data transforms of a job definition prior to processing the data. Responsive to the examination (e.g., the determination) of the data transform, the processing engine 150 and/or the execution engine 160 may generate an execution plan. The execution plan may group, combine, or otherwise consolidate data transforms structured to optimize processing speed and/or memory. For example, the data transform is structured to increase processing speed, memory usage, or a combination thereof. In some examples, a data transform may be associated with one or more operation levels comprising a row level operation and/or a set level operation. For example, the data transforms may be grouped into one or more categories such as, but not limited to, a row level and/or a set level operation. A data transformation at a row level operation may be based on access to the content of a single row independent of other values. Examples of a data transformation based on a row level operation include formatting date time values, adding a row number to each row, filtering data, etc. A data transformation at a set level operation transforms may be based on access to a set of content (e.g., a partial set of content or a full set of data). Examples of a data transformation based on a set level operation include sorting, grouping, joining, and/or ordering of data.

As described herein, the processing engine 150 and/or the execution engine 160 may be further structured to sort content. The execution engine 160 may be structured to operate according to a memory sorting algorithm, an external sorting algorithm, or any other like sorting algorithm based on an amount of content (e.g., the size of the data) and a memory capacity threshold. The memory capacity threshold may be a user defined memory capacity threshold and/or a system defined memory capacity threshold. The sorted content may comprise an amount of content larger than the available amount of the memory. For example, the external sorting algorithm may be structured to sort datasets that are larger than memory capacity. The sorted content may include one or more content types. Alternatively or additionally, the content may be sortable in one or more directions. For example, the content may include a plurality of content types sorted in an ascending direction or a descending direction.

The server 101 may be structured to execute a system action based on one or more action elements (e.g., a job definition structured to create a database for code scanning, perform a code scan, execute a system operation, transform data, delete empty files, etc.) The processing engine 150 may be communicably coupled to the action manager 140 and/or the content staging engine 130 to execute the system action as described herein. The system action may be defined by one or more action elements. The content staging engine 130 may be structured to generate the system action according to the one or more action elements. In some examples, the system action (e.g., a job definition) may be generated according to a pre-defined configuration (e.g., a user builds an XML file of the desired action elements). The processing engine 150 may generate a command structured to cause the system action. The server 101 may execute, via the content staging engine 130, the system action in a listed order to produce the desired outcome. In other embodiments, the server 101 may execute, via the content staging engine 130, the system action based on priority, system resources, etc.

In some embodiments, the content staging engine 130 may be structured to manage concurrent code scan requests. The code scan request may be associated with one or more internal systems, external systems, or a combination thereof. For example, the content staging engine 130 (e.g., a scheduling engine) may include settings to control the number of concurrent requests processed for one or more servers (e.g., the server 101), client devices (e.g., the client device 102 described herein with reference to FIG. 3), and/or other systems.

In order to reduce duplication of a system action, an action element may be created and shared or otherwise utilized across a plurality of system actions (e.g. across a plurality of job definitions). When a system action is received in memory of the content staging system 10, shared action elements may be resolved. The system action may be maintained or otherwise stored in memory for execution and/or retrieval.

The server 101 may be structured, via the content engine 155, to auto-switch between memory and a file system during processing of the data. In some embodiments, the auto-switch may occur based on a content amount (e.g., size of the content to be stored) and/or the memory processing requirement, such as the amount of RAM required to perform a given operation. In this regard, the content engine 155 may be structured to manage a memory capacity threshold (e.g., the amount of RAM) by determining whether the content amount of the received content exceeds the memory capacity threshold. The content engine 155 may be structured to auto-switch to memory when the content amount is below the memory capacity threshold. In some examples, the memory capacity threshold may be generated according to a pre-defined configuration. For example, a user may configure the memory capacity threshold. In turn, the content staging system 10 auto-switches between the memory and the file system dynamically or otherwise as needed. In examples wherein the content engine 155 of the content staging system 10 receives or otherwise retrieves content from an external system (e.g., the external system 110) and the content amount (e.g., the size) of the incoming content exceeds the memory capacity threshold (e.g., the configured limit), the content engine 155 auto-switches to the file system. Alternatively or additionally, if during transformation (e.g. during a filter, join, pivot, aggregation, etc.) the content amount of content is reduced below the memory capacity threshold, the content engine 155 of the content staging system 10 switches back to memory during processing. In some embodiments, the configured limit is determined in relation to the total memory capacity associated with a processor or a cluster of processors included in the content staging system 10. For example, in some embodiments, the configured limit is a percentage of total memory capacity, a percentage of total memory capacity allocated to a specific user (e.g., the author of the XML job definition file 400 of FIG. 4), a percentage of total memory capacity allocated to a specific application (e.g., the source application or the target application of the staged content), etc.

Source agnostic files may be generated using the memory switching process described above. In some embodiments, the source agnostic file is generated, pursuant to a source agnostic file format, entirely in-memory. In some embodiments, the source agnostic file is sent to the external system 112 and is never retained in the memory associated with the content staging system 10. In some embodiments, the source agnostic file is generated using a combination of in-memory and file-based processing. In some embodiments, the source agnostic file is retained in the memory and/or the file system associated with the content staging system 10 for a predetermined amount of time. The amount of time may be determined by the expiration timestamp of the source agnostic file.

Figure 3:
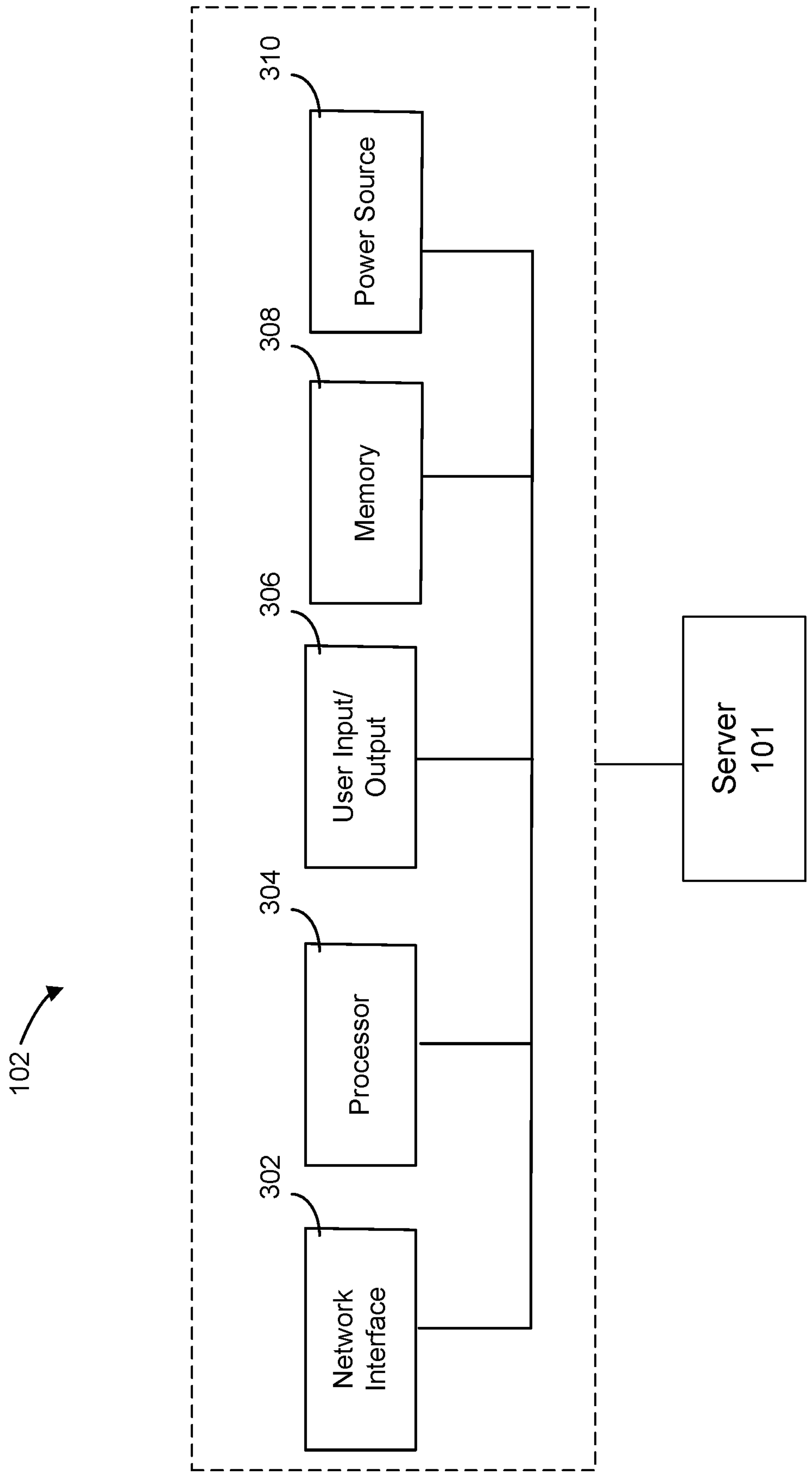
FIG. 3 is a block diagram of a client device according to an example embodiment.

Referring to FIG. 3, a block diagram of the client device 102 is shown according to an example embodiment. The client device 102 may transmit a request (e.g., a request for data) to the server 101. In turn, the server 101 may transmit a response, content, data, and/or resources to the client device 102. The content staging system 10 may include the client device 102. Accordingly, the client device 102 and the server 101 may reside on the same or different hardware such that the client device 102 may be communicably coupled to or otherwise may communicate with the server 101 via an inter-process communication. In some examples, the client device 102 may communicate with the content staging system 10 through a network such that the client device 102 may communicate with the server 101 over a network on separate hardware. The network may include the Internet, a cloud computing network, a cellular network, a personal area network, Wifi network, etc. In some embodiments, the client device 102 may execute a system action and/or a content staging system application associated with the content staging system 10. The content staging system application may include a user interface. In some arrangements, the content staging system application may be executed locally on the client device 102. The client device 102 may include a network device, personal computing devices such as laptops, tablet computing devices, PDAs, portable media devices, mobile devices, smartphones, etc. that may access one or more servers (e.g., one or more servers 101), programs, networks, central computers, etc.

The client device 102 may include a network interface 302. The network interface 302 may be a wireless network interface. The wireless network interface 302 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Additionally, the network interface 302 is capable of communicating with the content staging system 10 via a network (e.g., via any combination of the Internet, cellular networks, personal area networks, Wifi networks, etc.).

The client device 102 may include the processor 304. The processor 304 may execute instructions stored in the memory 308. The processor 304 may be structured to programmatically execute instructions to perform at least the operations described herein. The client device 102 may include a user input/output 306. The user input/output 306 may include a display. In some arrangements, the display and the user input/output 306 are combined (e.g., as a touchscreen display device). In other arrangements, the display and the user input/output 306 are discrete devices. The user input/output 306 includes any of speakers, keyboards, notification LEDs, microphones, buttons, switches, cameras, or a combination thereof.

The client device 102 includes a power source 310. The power source 310 may include grid power, battery power (e.g., alkaline batteries, rechargeable batteries, etc.), and/or another energy source. In arrangements where the power source 310 is a rechargeable battery, the client device 102 also includes circuitry structured to recharge the battery.

FIG. 4 is an example job definition for the content staging system, such as the content staging system 10 if FIG. 1. According to various embodiments, a user may edit the XML job definition file 400 on the client device 102 of FIG. 3 using a text editor or another editor suitable to the type and operating system of the user device.

In some embodiments, the content staging system 10 may be used for workflow execution in addition to content transformation. As shown, the XML job definition file 400 comprises a job definition to be executed by one or more circuits of the content staging system 10. The content staging system 10 includes a content repository and/or code packages that carry out various system management functions. Example system management functions may include executing a command via a command line (at 402), executing a SQL or another query/data manipulation language command (at 404), token creation and management (at 406), such as setting configuration values, file system operations (at 408), such as copy, move, delete, etc., file compression and decompression, etc.

In some embodiments, the content imported by the content staging system 10 includes software code. In such embodiments, the system management functions may further include file scanning/integrity analysis commands, database optimization commands, etc. These commands may be issued via the command line tool or through an API function that executes an auxiliary software integrity analysis application, such as CAST. Thus, advantageously, scheduling and management of code integrity analyses may be facilitated.

In some embodiments, the content staging system 10 is configured to analyze the XML job definition file 400 and develop an execution plan. For example, where the XML job definition file 400 includes SQL commands, the content staging system 10 is configured to create an execution plan that combines data transformation operations (such as row-level or set-level) for efficient processing. For each of these operations, a size of the required dataset may be calculated and compared to a predetermined threshold. In some embodiments, a user may set the threshold using the XML job definition file 400. The content staging system 10 is configured to perform the respective transformation operations in-memory, in-file, and/or to periodically monitor the dataset size during the transformation operation and switch between the memory utilization modes.

In some embodiments, one or more circuits of the content staging system 10 of FIG. 1 are implemented using a suitable programming language, such as Java, and deployed as one or more .jar files. In such embodiments, the XML job definition file 400 may be included as a resource in the one or more .jar files such that the operating parameters specified in the XML job definition file 400 may be referenced during the operation of the content staging system 10. According to various embodiments, the resulting .jar files may be directly executed on a local system, plugged into a web service, placed in a specified network path, etc. In some embodiments, the resulting .jar files are sent, via the API 112, to the external system or systems 110 of FIG. 2 for execution thereon.

In some embodiments, the XML job definition file 400 supports shared system definitions. For example, a user may import a library of functions and/or code shared among various job definition files. Thus, advantageously, the job definition process is modular and does not require that common functions and operations be defined from scratch for each XML job definition file 400.

FIG. 5 is an example log file 500 that may be generated by the content staging system 10 of FIG. 1. In an example embodiment, when the .jar files, generated according to the XML specification of the XML job definition file 400, are executed, a log file 500 is output and comprises captured run-time values. According to an example embodiment, the log file 500 comprises environment information 502, definition details 504, setup token information 506, and prepared definition(s) 508. All or some of the aforementioned parameters are configured using the XML job definition file 400 of FIG. 5. Advantageously, the log file 500 facilitates and reduces the time required for analysis of various content staging and transformation jobs executed by the content staging system 10. For example, in embodiments where the input to the content staging system 10 is software code analyzed for integrity using the XML job definition file 400 of FIG. 4, the log 500 captures information about the outcome of the analysis and allows developers and testers to take prompt action. Thus, deployment of content to target systems is streamlined.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A content staging system comprising a non-transitory memory, random access memory, at least one processor, and circuitry comprising a reference resource, the reference resource comprising an execution plan retrievably stored in the non-transitory memory and a job definition specification retrievably stored in the non-transitory memory and comprising at least one setting, the execution plan structured to perform, by the at least one processor and according to the job definition specification, operations comprising:
- receiving content comprising a plurality of elements;
- referencing the at least one setting in the job definition specification;
- based on the referenced at least one setting, determining a memory capacity threshold of the random access memory;
- determining whether a content size of the received content exceeds the memory capacity threshold of the random access memory; and
- auto-switching from the random access memory to a file system during processing of the content when the content size exceeds the memory capacity threshold.

2. The system of claim 1, the execution plan further structured to perform operations comprising:
- while processing the content, transforming the content.

3. The system of claim 2, the execution plan further structured to perform operations comprising encrypting the content at least in part.

4. The system of claim 2, the execution plan further structured to perform operations comprising including a content expiration timestamp in the content.

5. The system of claim 2, the execution plan further structured to perform operations comprising transforming the content according to a file definition format, wherein the file definition format comprises a header indicative of a content schema, a footer structured to track the field of the plurality of dataset elements, or a combination thereof.

6. The system of claim 2, the execution plan further structured to perform operations comprising eliminating duplication of values in the content.

7. The system of claim 2, the execution plan further structured to perform operations comprising sorting the content at least in part.

8. The system of claim 1, wherein the memory capacity threshold is one of a user defined memory capacity threshold and a system defined memory capacity threshold.

9. A computer-implemented method performed by a content staging system comprising a non-transitory memory, random access memory, at least one processor, and circuitry comprising a reference resource, the reference resource comprising an execution plan retrievably stored in the non-transitory memory and a job definition specification retrievably stored in the non-transitory memory and comprising at least one setting, the method comprising:
- receiving content comprising a plurality of elements;
- referencing the at least one setting in the job definition specification;
- based on the referenced at least one setting, determining a memory capacity threshold of the random access memory;
- determining whether a content size of the received content exceeds the memory capacity threshold of the random access memory; and
- auto-switching from the random access memory to a file system during processing of the content when the content size exceeds the memory capacity threshold.

10. The method of claim 9, further comprising:
- while processing the content, transforming the content.

11. The method of claim 10, further comprising encrypting the content at least in part.

12. The method of claim 10, further comprising including a content expiration timestamp in the content.

13. The method of claim 10, further comprising transforming the content according to a file definition format, wherein the file definition format comprises a header indicative of a content schema, a footer structured to track the field of the plurality of dataset elements, or a combination thereof.

14. The method of claim 10, further comprising eliminating duplication of values in the content.

15. The method of claim 10, further comprising sorting the content at least in part.

16. The method of claim 9, wherein the memory capacity threshold is one of a user defined memory capacity threshold and a system defined memory capacity threshold.

17. One or more computer-readable media having a reference resource, the reference resource comprising an execution plan retrievably stored in the non-transitory memory and a job definition specification retrievably stored in the non-transitory memory and comprising at least one setting, the execution plan, when executed by at least one processor, performing operations comprising:

receiving content comprising a plurality of elements;

referencing the at least one setting in the job definition specification;

based on the referenced at least one setting, determining a memory capacity threshold of the random access memory;

determining whether a content size of the received content exceeds the memory capacity threshold of the random access memory; and auto-switching from the random access memory to a file system during processing of the content when the content size exceeds the memory capacity threshold.

18. The media of claim 17, the execution plan further structured to perform operations comprising:

while processing the content, transforming the content.

19. The media of claim 18, the execution plan further structured to perform operations comprising encrypting the content at least in part.

20. The media of claim 18, the execution plan further structured to perform operations comprising including a content expiration timestamp in the content.

21. The media of claim 18, the execution plan further structured to perform operations comprising transforming the content according to a file definition format, wherein the file definition format comprises a header indicative of a content schema, a footer structured to track the field of the plurality of dataset elements, or a combination thereof.

22. The media of claim 18, the execution plan further structured to perform operations comprising eliminating duplication of values in the content.

23. The media of claim 18, the execution plan further structured to perform operations comprising sorting the content at least in part.

24. The media of claim 17, wherein the memory capacity threshold is one of a user defined memory capacity threshold and a system defined memory capacity threshold.

* * * * *